(12) United States Patent
Sakai et al.

(10) Patent No.: US 12,095,132 B2
(45) Date of Patent: Sep. 17, 2024

(54) COMPRESSION APPARATUS

(71) Applicant: Panasonic Intellectual Property Management Co., Ltd., Osaka (JP)

(72) Inventors: Osamu Sakai, Osaka (JP); Yukimune Kani, Osaka (JP); Takashi Kakuwa, Osaka (JP); Hiromi Kita, Nara (JP); Tomoya Kamata, Osaka (JP); Takayuki Nakaue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 621 days.

(21) Appl. No.: 17/471,726

(22) Filed: Sep. 10, 2021

(65) Prior Publication Data

US 2021/0408570 A1    Dec. 30, 2021

Related U.S. Application Data

(63) Continuation of application No. PCT/JP2021/005400, filed on Feb. 15, 2021.

(30) Foreign Application Priority Data

Apr. 20, 2020   (JP) ................................. 2020-074685
Jan. 20, 2021   (JP) ................................. 2021-007077

(51) Int. Cl.
   *H01M 8/248*   (2016.01)
   *H01M 8/0438*   (2016.01)
   (Continued)

(52) U.S. Cl.
   CPC ....... *H01M 8/248* (2013.01); *H01M 8/04388* (2013.01); *H01M 8/0656* (2013.01); *H01M 8/1004* (2013.01)

(58) Field of Classification Search
   CPC ............. H01M 8/248; H01M 8/04388; H01M 8/0656; H01M 8/1004; H01M 8/0228;
   (Continued)

(56) References Cited

U.S. PATENT DOCUMENTS 6,489,049 B1 * 12/2002 Johnson .................. H01M 8/20
                                                        429/446
2007/0246363 A1 * 10/2007 Eisman ................ B01D 53/326
                                                        204/252

(Continued)

FOREIGN PATENT DOCUMENTS

| JP | 2015-117139 | 6/2015 |
| JP | 2017-210660 | 11/2017 |
| JP | 2019-163521 | 9/2019 |

OTHER PUBLICATIONS

International Search Report of PCT application No. PCT/JP2021/005400 dated Apr. 13, 2021.

(Continued)

*Primary Examiner* — Muhammad S Siddiquee
(74) *Attorney, Agent, or Firm* — Rimon P.C.

(57) ABSTRACT

A compression apparatus includes a stack of electrochemical cells each including an anode, a cathode, and an electrolyte membrane interposed therebetween, a pair of insulating plates disposed at respective ends of the stack in a stacking direction, a pair of end plates disposed on outside surfaces of the respective insulating plates, and a voltage applicator that applies a voltage between the anode and the cathode. The end plate having the cathode gas channel includes a first region that includes an outer peripheral surface of the cathode gas channel and is composed of a first steel material and a second region other than the first region which is composed of a second steel material. The first steel material has higher hydrogen embrittlement resistance than the sec- (Continued)

ond steel material, and the second steel material has higher stiffness than the first steel material.

9 Claims, 4 Drawing Sheets

(51) Int. Cl.
 *H01M 8/0656* (2016.01)
 *H01M 8/1004* (2016.01)
(58) Field of Classification Search
 CPC ........ H01M 8/021; Y02E 60/36; Y02E 60/50; C01B 3/56; C25B 1/02; C25B 9/00; C25B 13/04; C25B 9/77; C25B 1/04; C25B 9/60; C25B 9/75; C25B 15/00; C22C 38/08
 See application file for complete search history.

(56) References Cited

U.S. PATENT DOCUMENTS

| | | | |
|---|---|---|---|
| 2009/0238713 A1* | 9/2009 | Kinugasa | C22C 38/42 420/104 |
| 2018/0155193 A1* | 6/2018 | Sakai | H01M 8/0681 |
| 2018/0166713 A1* | 6/2018 | Wakita | C25B 1/02 |
| 2018/0179647 A1* | 6/2018 | Ukai | C25B 1/04 |
| 2019/0383283 A1* | 12/2019 | Ukai | B01D 53/326 |
| 2020/0011313 A1* | 1/2020 | Ukai | H01M 8/248 |
| 2021/0384539 A1* | 12/2021 | Sakai | C25B 1/04 |

OTHER PUBLICATIONS

"High Pressure Gas Safety Act, Compressed Hydrogen Stand Technical Standards Explanation", Mar. 2017 (Partial Translation).

* cited by examiner

COMPRESSION APPARATUS

BACKGROUND

1. Technical Field

The present disclosure relates to a compression apparatus.

2. Description of the Related Art

Because of environmental issues, such as global warming, and energy problems, such as exhaustion of petroleum resources, great attention has been focused on hydrogen as a dean alternative energy resource to fossil fuel. High expectations have been placed on hydrogen as dean energy, since hydrogen basically produces only water, does not produce carbon dioxide, which contributes to global warming, and substantially does not produce nitrogen oxides when corn busted. Examples of apparatuses that use hydrogen as a fuel at high efficiencies include fuel cells, which have been developed and become popular for use in automobile power sources and household self-power generation.

For example, hydrogen used as a fuel for fuel cell vehicles is commonly stored in a hydrogen tank included in the vehicle at high pressures, that is, while compressed to several tens of megapascal. The high-pressure hydrogen is commonly produced by compressing low-pressure (normal pressure) hydrogen with a mechanical compression apparatus.

In the coming hydrogen society, there is a demand for the development of the technology for storing the hydrogen at high densities in order to transport or use the hydrogen at small volume and low costs, as well as the technology for producing hydrogen. In particular, it is necessary to upgrade hydrogen feed infrastructures for accelerating the popularization of fuel cells. There have been proposed various methods in which high-purity hydrogen is produced, purified, and stored at high densities in order to feed hydrogen consistently.

For example, Japanese Unexamined Patent Application Publication No. 2015-117139 proposes an electrochemical hydrogen pump that purifies and pressurizes hydrogen included in a hydrogen-containing gas by applying a predetermined voltage between an anode and a cathode that are provided with an electrolyte membrane interposed therebetween. Hereinafter, a multilayer body constituted by a cathode, an electrolyte membrane, and an anode is referred to as "membrane electrode assembly (MEA)". The hydrogen-containing gas fed to the anode may contain impurities. For example, the hydrogen-containing gas may be a hydrogen gas discharged from an iron-making factory or the like as a by-product or a reformed gas produced by reforming town gas.

For example, Japanese Patent No. 6382886 proposes a differential pressure water electrolyzes that produces low-pressure hydrogen by electrolysis of water and pressurizes the low-pressure hydrogen using MEAs.

For example, Japanese Unexamined Patent Application Publication No. 2019-163521 proposes an electrochemical hydrogen pump that may have a high hydrogen compression efficiency since at least a part of an anode catalyst layer is a mixed layer of the anode catalyst layer and an anode gas diffusion layer.

SUMMARY

One non-limiting and exemplary embodiment provides a compression apparatus that may enhance the properties of end plates that are disposed at the respective ends of a stack of electrochemical cells to hold the stack, compared with the compression apparatuses known in the related art.

In one general aspect, the techniques disclosed here feature a compression apparatus including a stack including a plurality of electrochemical cells stacked on top of one another, the electrochemical cells each including an anode, a cathode, and an electrolyte membrane interposed between the anode and the cathode, a pair of insulating plates disposed at respective ends of the stack in a direction in which the electrochemical cells are stacked, a pair of end plates disposed on outside surfaces of the respective insulating plates, and a voltage applicator that applies a voltage between the anode and the cathode. Upon the voltage applicator applying the voltage, the compression apparatus causes protons extracted from an anode fluid fed to the anode to move to the cathode and produces compressed hydrogen. At least one of the end plates has a cathode gas channel formed therein, the cathode gas channel through which a cathode gas including the compressed hydrogen flows. The end plate having the cathode gas channel includes a first region including an outer peripheral surface of the cathode gas channel, the first region being composed of a first steel material, and a second region other than the first region, the second region being composed of a second steel material. The first steel material has higher hydrogen embrittlement resistance than the second steel material, and the second steel material has higher stiffness than the first steel material.

The compression apparatus according to the above aspect of the present disclosure may enhance the properties of end plates that are disposed at the respective ends of a stack of electrochemical cells to hold the stack, compared with the compression apparatuses known in the related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An approach to enhancing the properties of end plates that are disposed at the respective ends of a stack of electrochemical cells to hold the stack was studied and, as a result, the following knowledges were obtained.

An electrochemical compression apparatus includes a stack of a plurality of electrochemical cells. Each of the electrochemical cells includes a pair of separators each disposed on the outside surface of a corresponding one of the anode and the cathode of the electrochemical cell. The electrochemical cells and the separators are stacked alternately on top of one another to form a multilayer body including, for example, about several tens to several hundreds of the electrochemical cells. The resulting multilayer body (stack) is sandwiched between a pair of end plates, with a pair of insulating plates and the like interposed between the end plates and the multilayer body. The end plates are fastened with a plurality of fasteners (e.g., bolts and nuts). This is the common multilayer fastening structure.

The end plates that are disposed at the respective ends of the stack of the electrochemical cells to hold the stack (hereinafter, these end plates may be referred to simply as "end plates") need to be composed of a material having high stiffness. This is for the following reasons.

During the operation of the compression apparatus, high-pressure hydrogen having a pressure of several tens of megapascals (e.g., about 40 MPa or 80 MPa) is present in the cathode of the stack. If the end plates do not have sufficiently high stiffness, the end plates may become deformed to curve outwardly due to the pressure of the hydrogen present in the cathode. When the elastic deformation of the members constituting the stack cannot follow the above deformation, gaps may be created between the members constituting the stack and, consequently, the contact resistance between these members may be increased. This may reduce the hydrogen compression efficiency of the compression apparatus. Accordingly, the end plates need to be composed of a high-stiffness material that enables the members constituting the stack to come into intimate contact with one another during the operation of the compression apparatus.

The end plates that are disposed at the respective ends of the stack of the electrochemical cells to hold the stack need to be composed of a material having high hydrogen embrittlement resistance. This is for the following reasons.

The high-pressure hydrogen having a pressure of several tens of megapascals which is present in the cathode of the stack during the operation of the compression apparatus is commonly discharged to the outside of the compression apparatus through a cathode gas channel formed in the end plates. Accordingly, the end plates need to be composed of a material resistant to hydrogen embrittlement.

With regard to the above circumstances, the inventors of the present disclosure conducted extensive studies and consequently conceived an idea of forming the end plates using two types of materials having different properties.

Specifically, a compression apparatus according to a first aspect of the present disclosure includes a stack including a plurality of electrochemical cells stacked on top of one another, the electrochemical cells each including an anode, a cathode, and an electrolyte membrane interposed between the anode and the cathode, a pair of insulating plates disposed at respective ends of the stack in a direction in which the electrochemical cells are stacked, a pair of end plates disposed on outside surfaces of the respective insulating plates, and a voltage applicator that applies a voltage between the anode and the cathode. Upon the voltage applicator applying the voltage, the compression apparatus causes protons extracted from an anode fluid fed to the anode to move to the cathode and produces compressed hydrogen. At least one of the end plates has a cathode gas channel formed therein, the cathode gas channel through which a cathode gas including the compressed hydrogen flows. The end plate having the cathode gas channel includes a first region including an outer peripheral surface of the cathode gas channel, the first region being composed of a first steel material, and a second region other than the first region, the second region being composed of a second steel material. The first steel material has higher hydrogen embrittlement resistance than the second steel material, and the second steel material has higher stiffness than the first steel material.

The compression apparatus according to the above aspect may enhance the properties of the end plates that are disposed at the respective ends of the stack of the electrochemical cells to hold the stack, compared with the compression apparatuses known in the related art.

Specifically, the first region has a cathode gas channel formed therein, through which a cathode gas including the hydrogen compressed in the cathode flows. In the compression apparatus according to this aspect, since the first region is composed of the first steel material having higher hydrogen embrittlement resistance than the second region, the occurrence of hydrogen embrittlement of the first region may be reduced. Moreover, in the compression apparatus according to this aspect, since the second region is composed of the second steel material having higher stiffness than the first region, the likelihood of the entirety of the end plates, which includes the first and second regions, becoming deformed to curve outwardly due to the pressure of the hydrogen present in the cathode CA may be reduced.

That is, the compression apparatus according to this aspect may enhance the properties of the end plates compared with the case where the end plates are composed of a single material.

A compression apparatus according to a second aspect of the present disclosure is based on the compression apparatus according to the first aspect, wherein the end plate having the cathode gas channel may include a first end plate having the cathode gas channel formed therein and a second end plate disposed on an outside surface of the first end plate, and wherein the first end plate may be composed of the first steel material, and the second end plate may be composed of the second steel material.

In the above-described compression apparatus, the first end plate has a cathode gas channel formed therein, through which a cathode gas including the hydrogen compressed in the cathode flows. In the compression apparatus according to this aspect, since the first end plate is composed of the first steel material having higher hydrogen embrittlement resistance than the second end plate, the occurrence of hydrogen embrittlement of the first end plate may be reduced. Moreover, in the compression apparatus according to this aspect, since the second end plate is composed of the second steel material having higher stiffness than the first end plate, the likelihood of the entirety of the end plates, which includes the first and second end plates, becoming deformed to curve outwardly due to the pressure of the hydrogen present in the cathode CA may be reduced.

A compression apparatus according to a third aspect of the present disclosure is based on the compression apparatus according to the first or second aspect, wherein the first steel material may have a nickel equivalent of greater than or equal to 26.3% by mass.

In general, the higher the nickel equivalent of a steel material, the lower the likelihood of hydrogen embrittlement of the steel material. In the compression apparatus according to this aspect, since a steel material having a nickel equivalent of greater than or equal to 26.3% by mass is used as a first steel material, the hydrogen embrittlement resistance of the first steel material may be enhanced compared with the case where a steel material having a nickel equivalent of less than 26.3% by mass is used.

In Japan, the High Pressure Gas Safety Act stipulates the types of material that can be used for forming structures in which high-pressure hydrogen is present from the viewpoint of resistance to hydrogen embrittlement. Specifically, for example, the High Pressure Gas Safety Act "Interpretation of Technical Standards for Compressed Hydrogen Filling Stations, Second Edition" limits the types of steel material for such structures to stainless steel materials such as SUS316L and SUH660.

In the case where, for example, SUS316L, which is less expensive and has higher versatility than SUH660, is used as a material for the end plates, it is necessary to increase the weight and size of the end plates for enhancing the stiffness of the end plates. Thus, in this case, there is a limit to the degree to which the stiffness of the end plates is enhanced.

On the other hand, in the case where, for example, SUH660, which is a special-purpose steel, is used as a material for the end plates, the material cost of the end plates is increased disadvantageously. Furthermore, the amount of time required by the production and processing of the end plates is also increased disadvantageously. That is, since SUH660 is not popular in common use, it is difficult to produce and process the end plates in a short time.

Accordingly, a compression apparatus according to a fourth aspect of the present disclosure is based on the compression apparatus according to any one of the first to third aspects, wherein the first steel material may include SUS316 or SUS316L.

In the compression apparatus according to this aspect, since SUS316 or SUS316L is used as a first steel material, the hydrogen embrittlement resistance of the end plates may be enhanced while an increase in the cost of the end plates is suppressed, compared with the case where SUH660 is used.

A compression apparatus according to a fifth aspect of the present disclosure is based on the compression apparatus according to any one of the first to third aspects, wherein the first steel material may include 4401-316-00-I, 4436-316-00-I, 4404-316-03-I, 4432-316-03-I, or 4436-316-91-I.

Note that SUS316 in Japanese Industrial Standards (JIS) corresponds to 4401-316-00-I and 4436-316-00-I in International Standard (ISO) 15510. SUS316L in JIS corresponds to 4404-316-03-I, 4432-316-03-I, and 4436-316-91-I in ISO 15510.

A compression apparatus according to a sixth aspect of the present disclosure is based on the compression apparatus according to any one of the first to third aspects, wherein the first steel material may include 1.4401, 1.4436, 1.4404, 1.4432, or 1.4435.

Note that SUS316 in Japanese Industrial Standards (JIS) corresponds to 1.4401 and 1.4436 in European Standards (EN). SUS316L in JIS corresponds to 1.4404, 1.4432, and 1.4435 in EN.

A compression apparatus according to a seventh aspect of the present disclosure is based on the compression apparatus according to any one of the first to third aspects, wherein the first steel material may include S31600 or S31603.

Note that SUS316 in Japanese Industrial Standards (JIS) corresponds to S31600 in the Unified Numbering Systems (UNS). SUS316L in JIS corresponds to S31603 in UNS.

A compression apparatus according to an eighth aspect of the present disclosure is based on the compression apparatus according to any one of the first to third aspects, wherein the first steel material may include S31608 or S31603.

Note that SUS316 in Japanese Industrial Standards (JIS) corresponds to S31608 in the China National Standards (GB). SUS316L in JIS corresponds to S31603 in GB.

A compression apparatus according to a ninth aspect of the present disclosure is based on the compression apparatus according to any one of the first to eighth aspects, wherein the second steel material may include a chromium molybdenum steel.

In the compression apparatus according to this aspect, since a chromium molybdenum steel, which has lower hydrogen embrittlement resistance but is less expensive and has higher stiffness than SUS316L, is used as a second steel material, the stiffness of the end plates may be enhanced while an increase in the cost of the end plates is suppressed, compared with the case where SUS316L is used.

Embodiments of the present disclosure are described with reference to the attached drawings below. The following embodiments are merely illustrative of examples of the foregoing aspects. Therefore, the shapes, materials, components, the arrangement of the components, the connections between the components, etc. are merely examples and do not limit the above-described aspects unless otherwise specified in the claims. Among the components described below, components that are not described in the independent claims, which indicate the highest concepts of the above-described aspects, are described as optional components. The description of components denoted by the same reference numeral in the drawings may be omitted. In the drawings, components are illustrated schematically for ease of comprehension; the shapes of the components, the dimensional ratio between the components, etc. are not always accurate.

First Embodiment

Any types of gases and liquids that are fluids capable of producing protons upon the occurrence of an oxidation reaction in the anode may be used as an anode fluid of the above-described compression apparatus.

For example, in the case where the compression apparatus is an electrochemical hydrogen pump, examples of the anode fluid include a hydrogen-containing gas. In such a case, an oxidation reaction of hydrogen ($H_2$) included in the hydrogen-containing gas occurs in the anode catalyst layer.

For example, in the case where the compression apparatus is a water electrolyzer, examples of the anode fluid include liquid water. In such a case, an electrolysis reaction of water occurs in the anode catalyst layer.

In the following embodiment, the structure of an electrochemical hydrogen pump, which is an example of the compression apparatus in which the anode fluid is a hydrogen-containing gas, and the operation of the electrochemical hydrogen pump are described.

Apparatus Structure

Figure 1A:
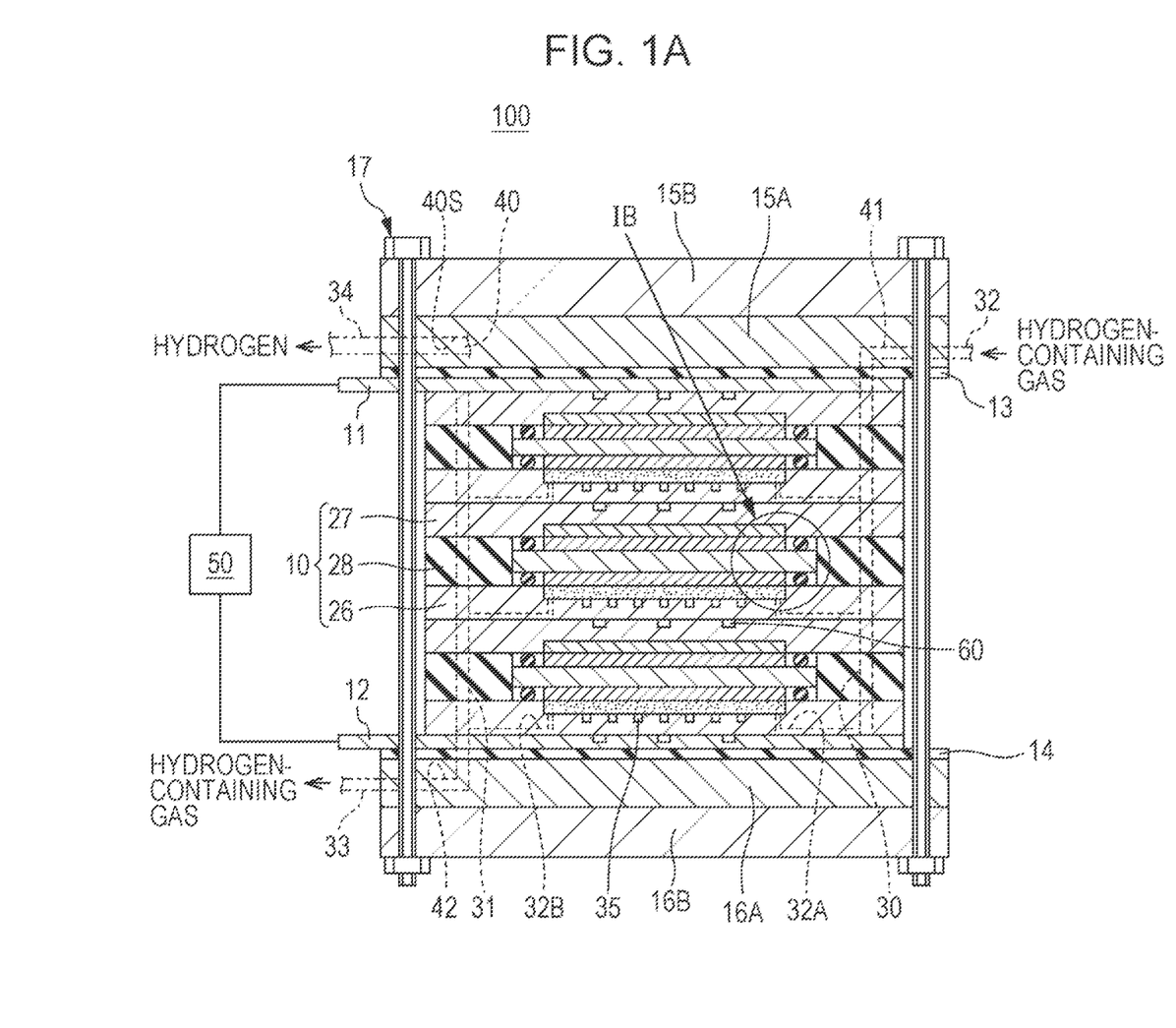
FIG. 1A is a diagram illustrating an example of an electrochemical hydrogen pump according to a first embodiment.
Figure 1B:
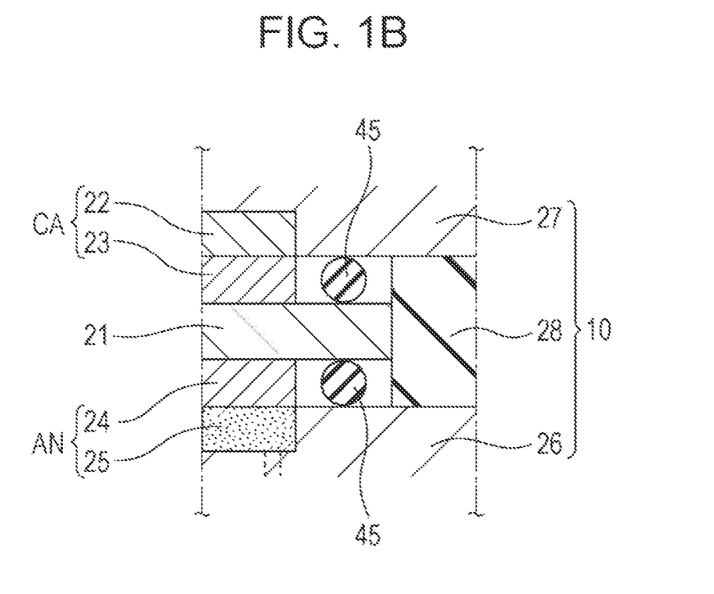
FIG. 1B is a magnified view of the part denoted by "IB" in FIG. 1A.

FIG. 1A is a diagram illustrating an example of an electrochemical hydrogen pump according to a first embodiment. FIG. 1B is a magnified view of the part denoted by "IB" in FIG. 1A.

In the example illustrated in FIGS. 1A and 1B, an electrochemical hydrogen pump 100 includes a stack including a plurality of electrochemical cells 10 stacked on top of one another, each of the electrochemical cells 10 including an anode AN, a cathode CA, and an electrolyte membrane 21 interposed therebetween.

Although three electrochemical cells 10 are stacked on top of one another in FIG. 1A, the number of the electrochemical cells 10 is not limited to this. That is, the number of the electrochemical cells 10 may be set appropriately in accordance with the operating conditions, such as the amount of hydrogen compressed by the electrochemical hydrogen pump 100.

The electrochemical cell 10 includes an electrolyte membrane 21, an anode AN, a cathode CA, a cathode separator 27, an anode separator 26, and an insulator 28.

In the electrochemical cell 10, the electrolyte membrane 21, an anode catalyst layer 24, a cathode catalyst layer 23, an anode power feeder 25, a cathode power feeder 22, the anode separator 26, and the cathode separator 27 are stacked on top of one another.

The anode AN is disposed on one of the principal surfaces of the electrolyte membrane 21. The anode AN is an electrode including the anode catalyst layer 24 and the anode power feeder 25. An O-ring 45 is disposed on the anode separator 26 so as to surround the anode catalyst layer 24 included in the anode AN when viewed in plan. This enables the anode AN to be sealed with the O-ring 45 in an appropriate manner.

The cathode CA is disposed on the other principal surface of the electrolyte membrane 21. The cathode CA is an electrode including the cathode catalyst layer 23 and the cathode power feeder 22. An O-ring 45 is disposed on the cathode separator 27 so as to surround the cathode catalyst layer 23 included in the cathode CA when viewed in plan. This enables the cathode CA to be sealed with the O-ring 45 in an appropriate manner.

Thus, the electrolyte membrane 21 is sandwiched between the anode AN and the cathode CA so as to come into contact with the anode catalyst layer 24 and the cathode catalyst layer 23.

The electrolyte membrane 21 is a proton-conducting polymer membrane. The electrolyte membrane 21 may be any polymer membrane having protonic conductivity.

Examples of the electrolyte membrane 21 include, but are not limited to, a fluorine-based polymer electrolyte membrane and a hydrocarbon polymer electrolyte membrane. Specific examples of the electrolyte membrane 21 include Nafion (registered trademark, produced by Du Pont) and Aciplex (registered trademark, produced by Asahi Kasei Corporation).

The anode catalyst layer 24 is arranged to abut against one of the principal surfaces of the electrolyte membrane 21. Examples of a catalyst metal included in the anode catalyst layer 24 include, but are not limited to, platinum.

The cathode catalyst layer 23 is arranged to abut against the other principal surface of the electrolyte membrane 21. Examples of a catalyst metal included in the cathode catalyst layer 23 include, but are not limited to, platinum.

Examples of a catalyst carrier for the cathode catalyst layer 23 and the anode catalyst layer 24 include, but are not limited to, carbon particles, such as carbon black particles and graphite particles; and electrically conductive oxide particles.

In the cathode catalyst layer 23 and the anode catalyst layer 24, highly-dispersed microparticles of the catalyst metal are supported on the catalyst carrier. In addition, a proton-conducting ionomer component is commonly added to the cathode catalyst layer 23 and the anode catalyst layer 24 in order to increase the electrode reaction field.

The cathode power feeder 22 is disposed on the cathode catalyst layer 23. The cathode power feeder 22 is composed of a porous material and has electrical conductivity and gas diffusibility. The cathode power feeder 22 desirably has a certain degree of elasticity that enables the cathode power feeder 22 to appropriately follow the displacement and deformation of the components which may occur during the operation of the electrochemical hydrogen pump 100 due to the pressure difference between the cathode CA and the anode AN. In the electrochemical hydrogen pump 100 according to this embodiment, a member composed of carbon fibers is used as a cathode power feeder 22. Porous carbon fiber sheets, such as a carbon paper sheet, a carbon cloth, and a carbon felt sheet, may also be used. A carbon fiber sheet is not necessarily used as a substrate for the cathode power feeder 22; other examples of the substrate for the cathode power feeder 22 include a sintered body of metal fibers produced using titanium, a titanium alloy, or stainless steel as a raw material; and a sintered body of metal particles produced using any of the above raw materials.

The anode power feeder 25 is disposed on the anode catalyst layer 24. The anode power feeder 25 is composed of a porous material and has electrical conductivity and gas diffusibility. The anode power feeder 25 desirably has a high stiffness that reduces the displacement and deformation of the components which may occur during the operation of the electrochemical hydrogen pump 100 due to the pressure difference between the cathode CA and the anode AN.

Specific examples of a substrate for the anode power feeder 25 include a sintered body of a fiber or powder produced using titanium, a titanium alloy, stainless steel, carbon, or the like as a raw material, an expanded metal, a metal mesh, and a perforated metal.

The anode separator 26 is a member disposed on the anode AN. The cathode separator 27 is a member disposed on the cathode CA. Specifically, a recess is formed at the center of the anode separator 26, and the anode power feeder 25 is accommodated in the recess. A recess is formed at the center of the cathode separator 27. The cathode power feeder 22 is accommodated in the recess.

The anode separator 26 and the cathode separator 27 may be composed of a metal sheet made of titanium, a stainless steel, or the Ike. In the case where the metal sheet is made of a stainless steel, among various types of stainless steels, SUS316L is excellent in terms of acid resistance, hydrogen embrittlement resistance, etc.

As illustrated in FIG. 1A, the principal surface of the cathode separator 27 which is in contact with the cathode power feeder 22 does not have a cathode gas channel formed therein and is constituted by a flat plane. This increases the contact area between the cathode power feeder 22 and the cathode separator 27, compared with the case where a cathode gas channel is formed in the principal surface of the cathode separator 27 and, as a result, reduces the contact resistance between the cathode power feeder 22 and the cathode separator 27 in the electrochemical hydrogen pump 100.

On the other hand, the principal surface of the anode separator 26 which is in contact with the anode power feeder 25 has a serpentine anode gas channel 35 formed therein, which includes, for example, a plurality of U-shaped turn-around portions and a plurality of straight portions when viewed in plan. The straight portions of the anode gas channel 35 extend in a direction perpendicular to the cross section illustrated in FIG. 1A. Note that the above-described anode gas channel 35 is merely illustrative; the anode gas channel is not limited to the above example. For example, the anode gas channel may be constituted by a plurality of straight channels.

A ring-like and flat plate-like insulator 28 is interposed between the cathode separator 27 and the anode separator 26 of each of the electrochemical cells 10 included in the electrochemical hydrogen pump 100 so as to surround the electrolyte membrane 21. Examples of the material constituting the insulator 28 include, but are not limited to, a fluorine rubber. This eliminates the risk of short circuit between the cathode separator 27 and the anode separator 26 in the electrochemical cell 10 in an appropriate manner.

Moreover, a heating medium channel 60 is formed in a region of the cathode separator 27 which is in contact with an adjacent anode separator 26 when viewed in plan. Although the heating medium channel 60 is constituted by a channel groove formed in the anode separator 26-side principal surface of the cathode separator 27 in this embodiment, the heating medium channel is not limited to this; the heating medium channel 60 may be formed in the principal surface of the anode separator 26. This enables the temperature of the electrochemical cell 10 to be controlled in an appropriate manner by adjusting the temperature, flow rate, etc. of a heating medium that flows through the heating medium channel 60 during the operation of the electrochemical hydrogen pump 100. Examples of the heating medium include, but are not limited to, liquid water and antifreeze.

Although not illustrated in the drawing, the cathode separator 27 and the anode separator 26 adjacent to each other may be merged with each other to form a bipolar plate. In such a case, the bipolar plate serves as both anode separator 26 of one of an adjacent pair of electrochemical cells 10 and cathode separator 27 of the other electrochemical cell 10. This reduces the number of components of the electrochemical hydrogen pump 100. For example, the number of the separators can be reduced. Furthermore, sealing members interposed between the separators can be omitted. In addition, merging the anode separator 26 and the cathode separator 27 with each other eliminates the gap present at the joint between the anode separator 26 and the cathode separator 27 and consequently reduces the contact resistance therebetween.

The above-described MEA is sandwiched between the cathode separator 27 and the anode separator 26 in the above-described manner to form the electrochemical cell 10.

As illustrated in FIG. 1A, the electrochemical hydrogen pump 100 includes a pair of power feed plates 11 and 12 disposed at the respective ends of the stack of the electrochemical cells 10 in the direction in which the electrochemical cells 10 are stacked; a pair of insulating plates 13 and 14 disposed on the outside surfaces of the power feed plates 11 and 12, respectively; a pair of first end plates 15A and 16A disposed on the outside surfaces of the insulating plates 13 and 14, respectively; and a pair of second end plates 15B and 16B disposed on the outside surfaces of the first end plates 15A and 16A, respectively.

The electrochemical hydrogen pump 100 also includes fasteners 17 with which the stack, the power feed plates 11 and 12, the insulating plates 13 and 14, the first end plates 15A and 16A, and the second end plates 153 and 163 are fastened in the above stacking direction.

In the example illustrated in FIG. 1A, the first and second end plates 15A and 15B constitute a cathode end plate disposed on one of the cathode separators 27 which is located at one of the ends in the stacking direction, in which the members constituting the electrochemical cells 10 are stacked, with the power feed plate 11 and the insulating plate 13 interposed between the cathode separators 27 and the cathode end plate. The first and second end plates 16A and 16B constitute an anode end plate disposed on one of the anode separators 26 which is located at the other end in the stacking direction, in which the members constituting the electrochemical cells 10 are stacked, with the power feed plate 12 and the insulating plate 14 interposed between the anode separators 26 and the anode end plate.

As illustrated in FIG. 1A, the first end plate 15A has a cathode gas channel 40 through which a cathode gas including the hydrogen compressed in the cathode CA flows and an anode gas feed channel 41 through which a hydrogen-containing gas fed from the outside to the anode AN flows, which are formed in the first end plate 15A. The first end plate 16A has an anode gas discharge channel 42 through which a hydrogen-containing gas discharged from the anode AN flows and, although not illustrated in the drawing, a cathode gas channel through which a cathode gas including the hydrogen compressed in the cathode CA flows, which are formed in the first end plate 16A.

Note that the structures of the above gas channels formed in the first end plates 15A and 16A are merely illustrative: the structures of the gas channels are not limited to the above example. For example, the cathode gas channel through which the cathode gas flows may be formed in only one of the first end plates 15A and 16A. For example, the anode gas discharge channel through which a hydrogen-containing gas discharged from the anode AN flows may be formed in the first end plate 15A, while the anode gas feed channel through which a hydrogen-containing gas fed from the outside to the anode AN flows is formed in the first end plate 16A.

In the electrochemical hydrogen pump 100 according to this embodiment, the end plates having the cathode gas channel include a first region including the outer peripheral surface of the cathode gas channel, the first region being composed of a first steel material, and a second region other than the first region, the second region being composed of a second steel material, in consideration of the structure of the gas channels formed in the end plates. The first steel material has higher hydrogen embrittlement resistance than the second steel material, and the second steel material has higher stiffness than the first steel material.

In the example illustrated in FIG. 1A, the first end plates 15A and 16A have higher hydrogen embrittlement resistance than the second end plates 15B and 16B, respectively. The second end plates 15B and 16B have higher stiffness than the first end plates 15A and 16A, respectively.

Note that, in the case where a cathode gas channel 40 is not formed in the second end plate 15B and is formed in the first end plate 15A as illustrated in FIG. 1A, the first end plate 15A corresponds to the "first region including the outer peripheral surface 40S of the cathode gas channel 40". In the case where the cathode gas channel 40 is a through-hole as illustrated in FIG. 1A, the expression "outer peripheral surface 40S of the cathode gas channel 40" used herein refers to a hole surface constituting the through-hole. Furthermore, the second end plate 15B corresponds to the "second region other than the first region".

Examples of the material constituting the first end plates 15A and 16A are described in the first example below. Examples of the material constituting the second end plates 15B and 16B are described in the second example below. Other examples of the structures of the "first region" and the "second region" are described in the third embodiment below.

The fasteners 17 may be any fasteners capable of fastening the stack of the electrochemical cells 10, the power feed plates 11 and 12, the insulating plates 13 and 14, the first end plates 15A and 16A, and the second end plates 15B and 16B in the above stacking direction. Examples of the fasteners 17 include bolts and nuts with conical spring washer.

Thus, in the electrochemical hydrogen pump 100 according to this embodiment, a plurality of the electrochemical cells 10 are appropriately held by the fastening pressure of the fasteners 17 in the above stacking direction, while stacked on top of one another. This enhances the sealing capability of the sealing members interposed between the members constituting the electrochemical cells 10 to an adequate degree and reduces the contact resistance between the members.

In the electrochemical hydrogen pump 100 according to this embodiment, a plurality of the electrochemical cells 10 are appropriately held by the fastening pressure of the fasteners 17 in the above stacking direction, while stacked on top of one another as a result of bolts that serve as fasteners 17 penetrating both first end plates 15A and 16A and second end plates 15B and 16B. However, the above holding structure is merely illustrative; the holding structure is not limited to this. Another example of the structure in which the electrochemical cells 10 are held by the fasteners 17 is described in the second embodiment below.

The first end plate 15A illustrated in FIG. 1A has an anode gas entry pathway 32 formed therein. The anode gas entry pathway 32 may be constituted by, for example, a piping through which a hydrogen-containing gas fed to the anode AN flows.

The anode gas entry pathway 32 is communicated with a cylindrical anode gas entry manifold 30 through the anode gas feed channel 41. The anode gas entry manifold 30 is constituted by a series of through-holes formed in the members constituting the electrochemical cells 10.

In the electrochemical hydrogen pump 100 according to this embodiment, each of the electrochemical cells 10 has a first communicating path 32A through which the anode gas entry manifold 30 and the anode gas channel 35 are communicated with each other, the first communicating path 32A being formed in a principal surface of the anode separator 26 in which the anode AN of the electrochemical cell 10 is not disposed. For example, the first communicating path 32A may be constituted by a channel groove and a communicating hole that are formed in the anode separator 26. The first communicating path 32A is arranged to extend from one of the ends of the serpentine anode gas channel 35 to the anode gas entry manifold 30.

Thus, the anode gas entry manifold 30 is communicated with an end of the anode gas channel 35 included in each of the electrochemical cells 10 through the first communicating path 32A. This enables a hydrogen-containing gas fed from the anode gas entry pathway 32 to the anode gas entry manifold 30 to be distributed to each of the electrochemical cells 10 through the first communicating path 32A of the electrochemical cell 10. While the distributed hydrogen-containing gas passes through the anode gas channel 35, the hydrogen-containing gas is fed from the anode power feeder 25 to the anode catalyst layer 24.

The first end plate 16A illustrated in FIG. 1A has an anode gas delivery pathway 33 formed therein. The anode gas delivery pathway 33 may be constituted by, for example, a piping through which a hydrogen-containing gas discharged from the anode AN flows.

The anode gas delivery pathway 33 is communicated with a cylindrical anode gas delivery manifold 31 through the anode gas discharge channel 42. The anode gas delivery manifold 31 is constituted by a series of through-holes formed in the members constituting the electrochemical cells 10.

In the electrochemical hydrogen pump 100 according to this embodiment, each of the electrochemical cells 10 has a second communicating path 32B through which the anode gas delivery manifold 31 and the anode gas channel 35 are communicated with each other, the second communicating path 32B being formed in a principal surface of the anode separator 26 in which the anode AN of the electrochemical cell 10 is not disposed. For example, the second communicating path 32B may be constituted by a channel groove and a communicating hole that are formed in the anode separator 26. The second communicating path 32B is arranged to extend from the other end of the serpentine anode gas channel 35 to the anode gas delivery manifold 31.

Thus, the anode gas delivery manifold 31 is communicated with the other end of the anode gas channel 35 included in each of the electrochemical cells 10 through the second communicating path 32B. This enables the hydrogen-containing gas that has passed through the anode gas channel 35 of each of the electrochemical cells 10 to be fed to the anode gas delivery manifold 31 through the second communicating path 32B. The hydrogen-containing gases merge with one another in the anode gas delivery manifold 31. The merged hydrogen-containing gas is delivered to the anode gas delivery pathway 33.

The first end plate 15A illustrated in FIG. 1A has a cathode gas delivery pathway 34 formed therein. The cathode gas delivery pathway 34 may be constituted by, for example, a piping through which a cathode gas including the hydrogen compressed in the cathode CA flows. Note that, as described above, although not illustrated in the drawing, a cathode gas delivery pathway similar to the cathode gas delivery pathway 34 is formed in the first end plate 16A.

The cathode gas delivery pathway 34 is communicated with a cylindrical cathode gas delivery manifold (not illustrated in the drawing) through the cathode gas channel 40. The cathode gas delivery manifold is constituted by a series of through-holes formed in the members constituting the electrochemical cells 10.

In each of the electrochemical cells 10 included in the electrochemical hydrogen pump 100 according to this embodiment, the cathode separator 27 has a communicating pathway (not illustrated in the drawing) formed therein, through which the inside of the recess of the cathode separator 27 and the inside of the cathode gas delivery manifold are communicated with each other.

This enables the cathode gas to be discharged to the cathode gas delivery pathway 34 after being passed through the communicating pathway, the cathode gas delivery manifold, and the cathode gas channel 40 in this order, during the operation of the electrochemical hydrogen pump 100.

As illustrated in FIG. 1A, the electrochemical hydrogen pump 100 includes a voltage applicator 50.

The voltage applicator 50 is a device that applies a voltage between the anode AN and the cathode CA. Specifically, a high potential of the voltage applicator 50 is applied to the anode AN, while a low potential of the voltage applicator 50 is applied to the cathode CA. The voltage applicator 50 may be any device capable of applying a voltage between the anode AN and the cathode CA. For example, the voltage applicator 50 may be a device that controls the voltage applied between the anode AN and the cathode CA. When the voltage applicator 50 is connected to a direct-current power source, such as a battery, a solar cell, or a fuel cell, the voltage applicator 50 includes a DC-to-DC converter. When the voltage applicator 50 is connected to an alternating-current power source, such as a commercial power source, the voltage applicator 50 includes an AC-to-DC converter.

The voltage applicator 50 may be, for example, a voltage-type power source, which controls the voltage applied between the anode AN and the cathode CA such that the voltage fed to the electrochemical cells 10 is maintained to be a predetermined value.

In the example illustrated in FIG. 1A, a low-potential-side terminal of the voltage applicator 50 is connected to the power feed plate 11, while a high-potential-side terminal of the voltage applicator 50 is connected to the power feed plate 12. The power feed plate 11 is arranged to come into electrical contact with the cathode separator 27 located at one of the ends of the multilayer body in the above stacking direction. The power feed plate 12 is arranged to come into electrical contact with the anode separator 26 located at the other end of the multilayer body in the stacking direction.

In the above-described manner, upon the voltage applicator 50 applying the above voltage, the electrochemical hydrogen pump 100 causes protons extracted from the hydrogen-containing gas fed to the anode AN to move to the cathode CA through the electrolyte membrane 21 and produces compressed hydrogen in the cathode CA.

Although not illustrated in the drawings, a hydrogen feed system including the above-described electrochemical hydrogen pump 100 may be produced. In such a case, devices required in the hydrogen feed action of the hydrogen feed system may be optionally formed as needed.

For example, the hydrogen feed system may include a dew point regulator (e.g., a humidifier) that controls the dew point of a mixed gas of the high-humidity hydrogen-containing gas discharged from the anode AN and the low-humidity hydrogen-containing gas fed from an external hydrogen feed source. The external hydrogen feed source may be a water electrolyzes, a reformer, a hydrogen tank, or the like.

The hydrogen feed system may also include, for example, a temperature sensor that detects the temperature of the electrochemical hydrogen pump 100, a hydrogen storage that temporarily stores the hydrogen discharged from the cathode CA of the electrochemical hydrogen pump 100, and a pressure sensor that detects the pressure of the hydrogen gas stored in the hydrogen storage.

Note that the above-described structure of the electrochemical hydrogen pump 100 and the above-described various devices included in the hydrogen feed system, which are not illustrated in the drawings, are merely illustrative; the structure of the electrochemical hydrogen pump 100 and devices included in the hydrogen feed system are not limited to the above-described examples. For example, a structure in which the anode gas delivery manifold 31 is omitted and the whole amount of hydrogen included in the hydrogen-containing gas fed to the anodes AN through the anode gas entry manifold 30 is compressed in the cathodes CA, that is, a "dead-end" structure, may be employed.

Action

An example of the hydrogen compression action of the electrochemical hydrogen pump 100 is described below with reference to the attached drawings.

The action described below may be performed by, for example, a computing circuit of a controller, which is not illustrated in the drawings, reading a control program from a memory circuit of the controller. Note that the action described below is not necessarily performed by a controller; part of the action may be performed by the operator.

First, a low-pressure hydrogen-containing gas that flows through the anode gas entry pathway 32 is fed to the anode AN of the electrochemical hydrogen pump 100 through the anode gas feed channel 41, the anode gas entry manifold 30, and the first communicating path 32A, and a voltage applied by the voltage applicator 50 is fed to the electrochemical hydrogen pump 100. The hydrogen-containing gas that has passed through the anode AN is discharged to the anode gas delivery pathway 33 through the second communicating path 32B, the anode gas delivery manifold 31, and the anode gas discharge channel 42.

Upon the application of the voltage, hydrogen molecules are split into protons and electrons in the anode catalyst layer 24 of the anode AN as a result of an oxidation reaction (Formula (1)). The protons transfers through the electrolyte membrane 21 and move to the cathode catalyst layer 23, while the electrons move to the cathode catalyst layer 23 through the voltage applicator 50.

In the cathode catalyst layer 23, hydrogen molecules are reproduced as a result of a reduction reaction (Formula (2)). It is known that, when the protons transfer through the electrolyte membrane 21, a predetermined amount of water also moves from the anode AN to the cathode CA as electro-osmosis water, accompanying with the protons.

The hydrogen ($H_2$) produced in the cathode CA can be compressed by increasing the pressure loss of the cathode gas delivery pathway 34 formed in the first end plate 15A using a flow rate regulator, which is not illustrated in the drawings. Examples of the flow rate regulator include a back pressure valve and a control valve disposed in the cathode gas delivery pathway 34.

$$\text{Anode; } H_2(\text{low pressure}) \rightarrow 2H^+ + 2e^- \quad (1)$$

$$\text{Cathode: } 2H^+ + 2e^- \rightarrow H_2(\text{high pressure}) \quad (2)$$

As described above, upon the voltage applicator 50 applying a voltage, the electrochemical hydrogen pump 100 causes protons extracted from a hydrogen-containing gas fed to the anode AN to move to the cathode CA and produces compressed hydrogen in the cathode CA. The hydrogen compression action of the electrochemical hydrogen pump 100 is performed in the above-described manner. The cathode gas including the hydrogen compressed in the cathode CA is passed through the communicating pathway, the cathode gas delivery manifold, and the cathode gas channel 40 and then temporarily stored in, for example, a hydrogen storage through the cathode gas delivery pathway 34. The hydrogen stored in the hydrogen storage is fed to a body that requires hydrogen at any time as needed. Examples of the body that requires hydrogen include a fuel cell, which generates power by using hydrogen.

As described above, the electrochemical hydrogen pump 100 according to this embodiment may enhance the properties of the cathode and anode end plates that are disposed at the respective ends of the stack of a plurality of the electrochemical cells 10 to hold the stack, compared with the compression apparatuses known in the related art.

Specifically, the first end plates 15A and 16A have a cathode gas channel formed therein, through which a cathode gas including the hydrogen compressed in the cathode CA flows. Accordingly, in the electrochemical hydrogen pump 100 according to this embodiment, the first end plates 15A and 16A are composed of a material having higher hydrogen embrittlement resistance than the second end plates 15B and 168. This reduces the occurrence of hydrogen embrittlement of the first end plates 15A and 16A. Furthermore, in the electrochemical hydrogen pump 100 according to this embodiment, the second end plates 15B and 16B are composed of a material having higher stiffness than the first end plates 15A and 16A. This reduces the likelihood of the entirety of the end plates, which includes the first and second end plates, becoming deformed to curve outwardly due to the pressure of the hydrogen present in the cathode CA. Since the second end plates 15B and 16B do not have a cathode gas channel through which a cathode gas including the hydrogen compressed in the cathode CA flows, the second end plates 15B and 16B may be composed of a material having lower hydrogen embrittlement resistance than the first end plates 15A and 16A.

In other words, the electrochemical hydrogen pump 100 according to this embodiment may enhance the properties of the cathode and anode end plates compared with the case where the cathode and anode end plates are composed of a single material.

First Example

An electrochemical hydrogen pump 100 according to a first example is the same as the electrochemical hydrogen pump 100 according to the first embodiment, except the materials constituting the first end plates 15A and 16A, which are described below.

Among various types of stainless steels, SUS316 and SUS316L have suitable properties in terms of acid resistance, hydrogen embrittlement resistance, etc. Thus, it is desirable that the first end plates 15A and 16A include SUS316 or SUS316L.

In general, the higher the nickel equivalent of a steel material, the lower the likelihood of hydrogen embrittlement of the steel material. In other words, the range of available hydrogen environment can be increased with an increase in the nickel equivalent of the first end plates 15A and 16A. Therefore, the nickel equivalent of the first end plates 15A and 16A is desirably greater than or equal to 26.3% by mass.

The nickel equivalent of a material is determined using Formula (3) below.

$$\text{Nickel equivalent (mass \%)} = 12.6 \times C + 0.35 \times Si + 1.05 \times Mn + Ni + 0.65 \times Cr + 0.98 \times Mo \quad (3)$$

In Formula (3), C, Si, Mn, Ni, Cr, and Mo represent the mass fractions (%) of carbon, silicon, manganese, nickel, chromium, and molybdenum.

Thus, in the electrochemical hydrogen pump 100 according to this example, a material having a nickel equivalent of greater than or equal to 26.3% by mass is used as a material constituting the first end plates 15A and 16A. This may enhance the hydrogen embrittlement resistance of the first end plates 15A and 16A compared with the case where a material having a nickel equivalent of less than 26.3% by mass is used.

Moreover, in the electrochemical hydrogen pump 100 according to this example, SUS316 or SUS316L is used as a material constituting the first end plates 15A and 16A. This may enhance the hydrogen embrittlement resistance of the first end plates 15A and 16A while suppressing an increase in the cost of the first end plates 15A and 16A, compared with the case where SUH660 is used.

The electrochemical hydrogen pump 100 according to this example may be the same as the electrochemical hydrogen pump 100 according to the first embodiment, except the above-described features.

Second Example

An electrochemical hydrogen pump 100 according to a second example is the same as the electrochemical hydrogen pump 100 according to the first embodiment, except the materials constituting the second end plates 15B and 16B, which are described below.

Since the second end plates 15B and 16B do not have a cathode gas channel through which a cathode gas including the hydrogen compressed in the cathode CA flows, the materials constituting the second end plates 15B and 16B desirably include a chromium molybdenum steel.

Thus, in the electrochemical hydrogen pump 100 according to this example, a chromium molybdenum steel, which has lower hydrogen embrittlement resistance but is less expensive and has higher stiffness than SUS316L, is used as a material constituting the second end plates 15B and 16B. This may enhance the stiffness of the second end plates 15B and 16B while suppressing an increase in the cost of the second end plates 15B and 16B, compared with the case where SUS316L is used.

The electrochemical hydrogen pump 100 according to this example may be the same as the electrochemical hydrogen pump 100 according to the first embodiment or the first example of the first embodiment, except the above-described features.

Second Embodiment

Figure 2:
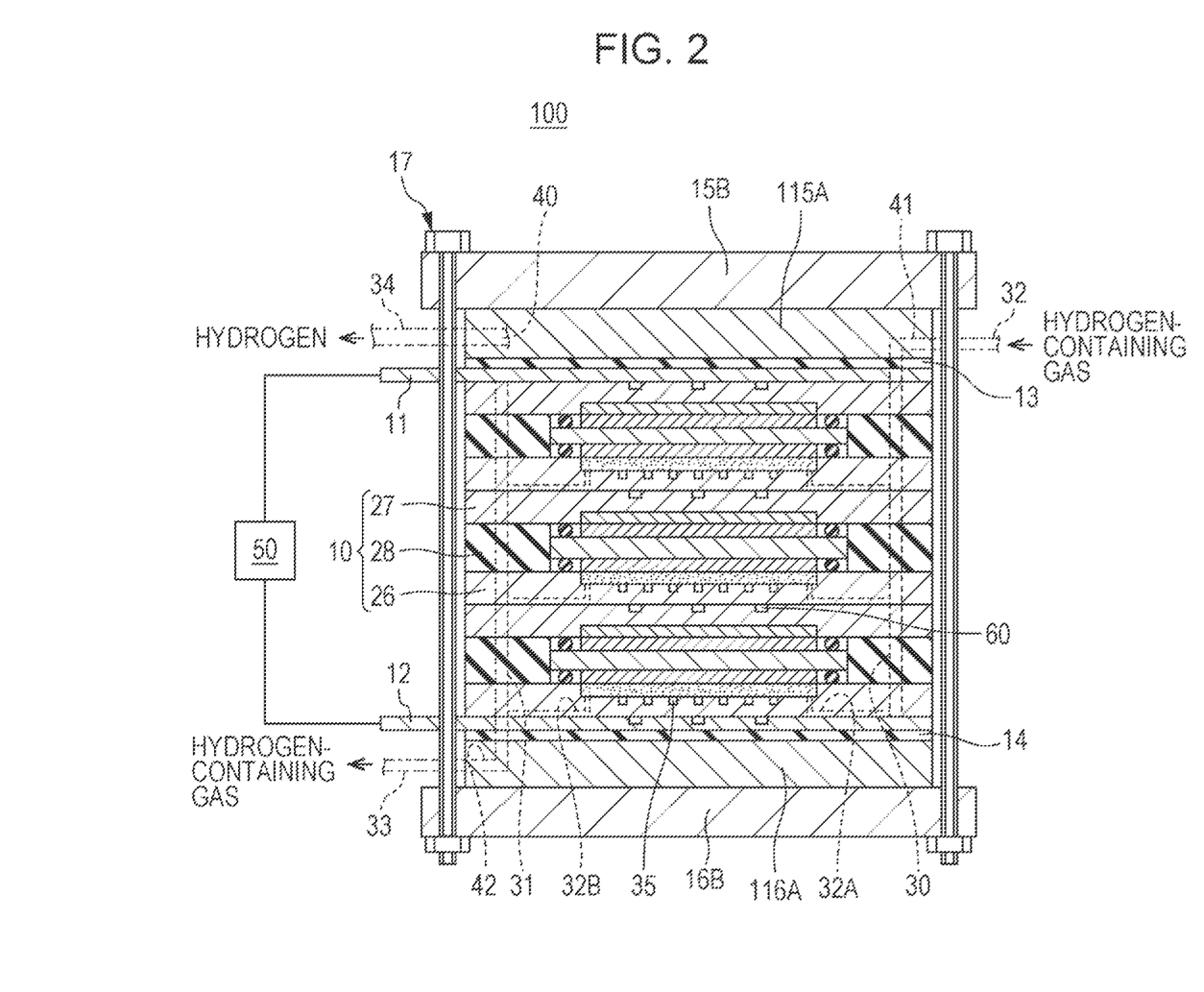
FIG. 2 is a diagram illustrating an example of an electrochemical hydrogen pump according to a second embodiment.

FIG. 2 is a diagram illustrating an example of an electrochemical hydrogen pump according to a second embodiment.

While the bolts that serve as fasteners 17 in the electrochemical hydrogen pump 100 according to the first embodiment are arranged to penetrate both first end plates 15A and 16A and second end plates 15B and 16B, in the electrochemical hydrogen pump 100 according to this embodiment, the bolts are arranged to penetrate only the second end plates 15B and 16B as illustrated in FIG. 2.

In other words, in the electrochemical hydrogen pump 100 according to this embodiment, the outside shapes of the first end plates 115A and 116A are smaller than those of the second end plates 15E3 and 16E3 such that the first end plates 115A and 116A do not touch the bolts serving as fasteners 17.

Thus, in the electrochemical hydrogen pump 100 according to this embodiment, the sizes of the first end plates 115A and 116A are reduced. This reduces the manufacturing costs of the first end plates 115A and 116A. Furthermore, the reduction in the sizes of the first end plates 115A and 116A results in a reduction in the heat capacity of the multilayer structure constituting the electrochemical hydrogen pump 100. Consequently, the amount of energy required for increasing and maintaining the temperature of the multilayer structure can be reduced. This means that, in the case where the temperature of the multilayer structure needs to be increased upon the start of operation, the amount of time required for starting the operation of the electrochemical hydrogen pump 100 can be reduced.

Note that, if the stiffness of the first end plates 115A and 116A becomes degraded as a result of the reduction in the sizes of the first end plates 115A and 116A, for example, the thicknesses of the second end plates 15B and 16B, which have higher stiffness than the first end plates 115A and 116A, may be increased. In such a case, using an inexpensive chromium molybdenum steel or the like as a material constituting the second end plates 15B and 16B may suppress an increase in the material cost of the second end plates 158 and 163.

The electrochemical hydrogen pump 100 according to this embodiment may be the same as the electrochemical hydrogen pump 100 according to the first embodiment, the first example of the first embodiment, or the second example of the first embodiment, except the above-described features.

Third Embodiment

Figure 3:
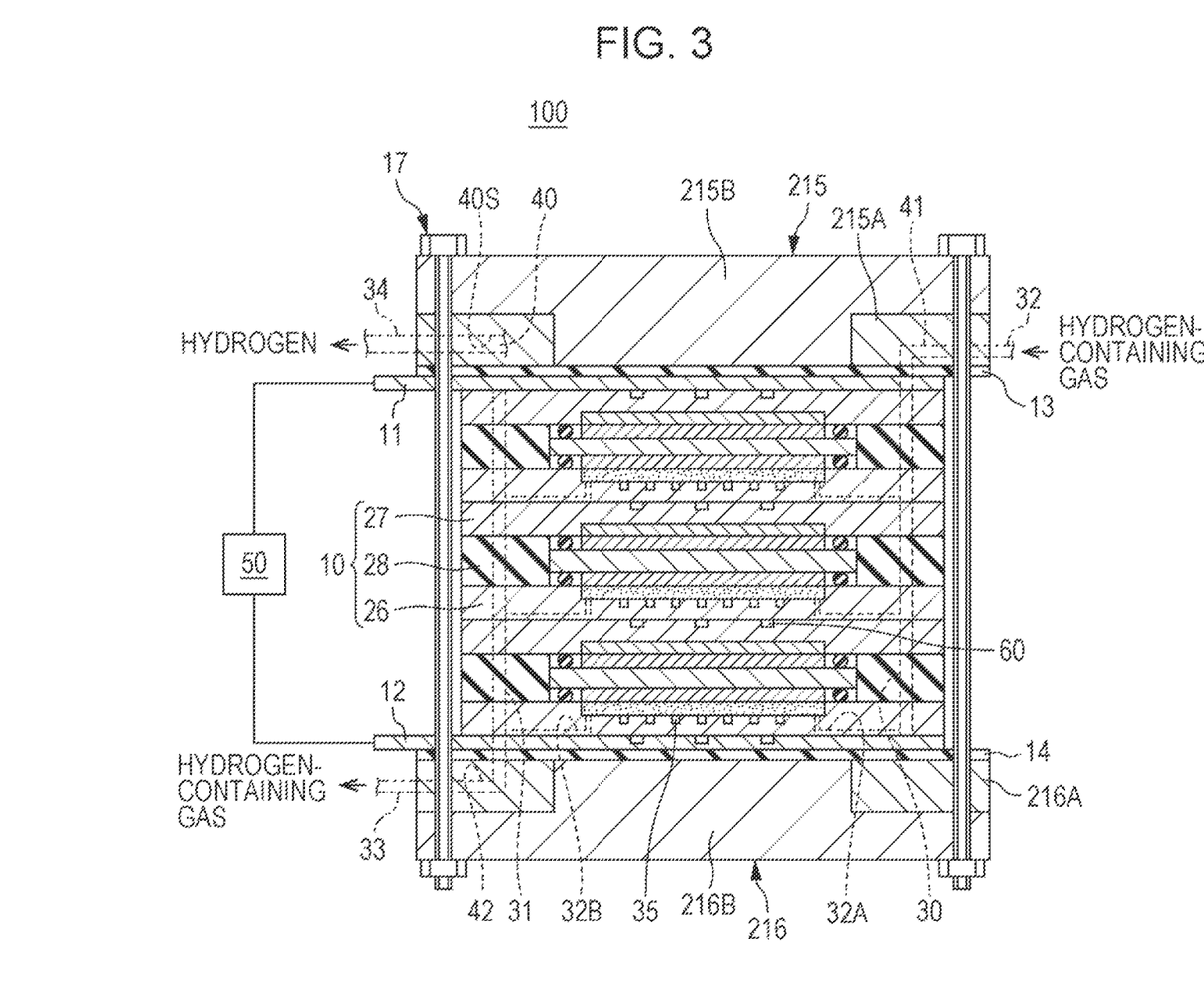
FIG. 3 is a diagram illustrating an example of an electrochemical hydrogen pump according to a third embodiment.

FIG. 3 is a diagram illustrating an example of an electrochemical hydrogen pump according to a third embodiment.

An electrochemical hydrogen pump 100 according to this embodiment is the same as the electrochemical hydrogen pump 100 according to the first embodiment, except the structure of the end plates, which is described below.

In the example illustrated in FIG. 3, a first portion 215A included in an end plate 215 is constituted by a ring-like body arranged to surround the cathodes CA of the electrochemical cells 10 when viewed in plan and to abut against the insulating plate 13. A second portion 215E of the end plate 215 includes a flat-plate portion arranged to abut against the first portion 215A so as to cover the outside surface of the first portion 215A when viewed in plan and a protruded portion arranged to be inserted in an opening of the first portion 215A so as to fill the opening and to abut against the insulating plate 13. In other words, the end plate 215, which is constituted by the first portion 215A and the second portion 215B, has a flat plate-like shape. Bolts that serve as fasteners 17 are disposed at positions above which the first portion 215A and the second portion 2153 are stacked on top of each other so as to penetrate the end plate as illustrated in FIG. 3.

A first portion 216A included in an end plate 216 is constituted by a ring-like body arranged to surround the anodes AN of the electrochemical cells 10 when viewed in plan and to abut against the insulating plate 14. A second portion 216B of the end plate 216 includes a flat-plate portion arranged to abut against the first portion 216A so as to cover the outside surface of the first portion 216A when viewed in plan and a protruded portion arranged to be inserted in an opening of the first portion 216A so as to fill the opening and to abut against the insulating plate 14. In other words, the end plate 216, which is constituted by the first portion 216A and the second portion 216B, has a flat plate-like shape. Bolts that serve as fasteners 17 are disposed at positions above which the first portion 216A and the second portion 216B are stacked on top of each other so as to penetrate the end plate as illustrated in FIG. 3.

Furthermore, the first portion 215A of the end plate 215 and the first portion 216A of the end plate 216 have higher hydrogen embrittlement resistance than the second portion 215B of the end plate 215 and the second portion 216B of the end plate 216, respectively. The second portion 215B of the end plate 215 and the second portion 216B of the end plate 216 have higher stiffness than the first portion 215A of the end plate 215 and the first portion 216A of the end plate 216, respectively.

Note that, in the case where a cathode gas channel 40 is not formed in the second portion 215B of the end plate 215 and is formed in the first portion 215A of the end plate 215 as illustrated in FIG. 3, the first portion 215A of the end plate 215 corresponds to the "first region including the outer peripheral surface 40S of the cathode gas channel 40". In the case where the cathode gas channel 40 is a through-hole as illustrated in FIG. 3, the expression "outer peripheral surface 40S of the cathode gas channel 40" used herein refers to a hole surface constituting the through-hole. Furthermore, the second portion 215B of the end plate 215 corresponds to the "second region other than the first region".

Although the first portion 215A and the second portion 215B of the end plate 215 are not joined to each other, they may be joined to each other to form a single member by welding, diffusion bonding, or the like. Similarly, although the first portion 216A and the second portion 216E of the end plate 216 are not joined to each other, they may be joined to each other to form a single member by welding, diffusion bonding, or the like.

The actions and advantageous effects of the electrochemical hydrogen pump 100 according to this embodiment are not described herein, because they can be readily understood with reference to the actions and advantageous effects of the electrochemical hydrogen pump 100 according to the first embodiment.

The electrochemical hydrogen pump 100 according to this embodiment may be the same as the electrochemical hydrogen pump 100 according to the first embodiment, the first example of the first embodiment, the second example of the first embodiment, or the second embodiment, except the above-described features.

The first embodiment, the first example of the first embodiment, the second example of the first embodiment, the second embodiment, and the third embodiment may be combined with one another as long as the combined embodiments do not contradict with each other.

From the foregoing description, various modifications and other embodiments of the present disclosure are obvious to one skilled in the art. Therefore, the foregoing description should be interpreted only as an example and is provided for the purpose of teaching the best mode for carrying out the present disclosure to one skilled in the art. The structural and/or functional details may be substantially altered without departing from the spirit of the present disclosure. For example, the end plates included in the electrochemical hydrogen pump 100 may be applied to other compression apparatuses, such as a water electrolyzer.

An aspect of the present disclosure may be applied to a compression apparatus that may enhance the properties of end plates that are disposed at the respective ends of a stack of electrochemical cells to hold the stack, compared with the compression apparatuses known in the related art.

What is claimed is:

1. A compression apparatus comprising:
    a stack including a plurality of electrochemical cells stacked on top of one another, the electrochemical cells each including an anode, a cathode, and an electrolyte membrane interposed between the anode and the cathode;
    a pair of insulating plates disposed at respective ends of the stack in a direction in which the electrochemical cells are stacked;
    a pair of end plates disposed on outside surfaces of the respective insulating plates; and
    a voltage applicator that applies a voltage between the anode and the cathode,
    wherein, upon the voltage applicator applying the voltage, the compression apparatus causes protons extracted from an anode fluid fed to the anode to move to the cathode and produces compressed hydrogen,
    wherein at least one of the end plates has a cathode gas channel formed therein, the cathode gas channel through which a cathode gas including the compressed hydrogen flows,
    wherein the end plate having the cathode gas channel includes a first region including an outer peripheral surface of the cathode gas channel, the first region being composed of a first steel material, and a second region other than the first region, the second region being composed of a second steel material, and wherein the first steel material has higher hydrogen embrittlement resistance than the second steel material, and the second steel material has higher stiffness than the first steel material.

2. The compression apparatus according to claim 1, wherein the end plate having the cathode gas channel includes a first end plate having the cathode gas channel formed therein and a second end plate disposed on an outside surface of the first end plate, and wherein the first end plate is composed of the first steel material, and the second end plate is composed of the second steel material.

3. The compression apparatus according to claim 1, wherein the first steel material has a nickel equivalent of greater than or equal to 26.3% by mass.

4. The compression apparatus according to claim 1, wherein the first steel material includes SUS316 or SUS316L.

5. The compression apparatus according to claim 1, wherein the first steel material includes 4401-316-00-I, 4436-316-00-I, 4404-316-03-I, 4432-316-03-I, or 4436-316-91-I.

6. The compression apparatus according to claim 1, wherein the first steel material includes 1.4401, 1.4436, 1.4404, 1.4432, or 1.4435.

7. The compression apparatus according to claim 1, wherein the first steel material includes S31600 or S31603.

8. The compression apparatus according to claim 1, wherein the first steel material includes S31608 or S31603.

9. The compression apparatus according to claim 1, wherein the second steel material includes a chromium molybdenum steel.

* * * * *